(12) United States Patent
Bakx et al.

(10) Patent No.: US 8,310,912 B2
(45) Date of Patent: Nov. 13, 2012

(54) METHOD FOR MONITORING AN OPTICAL DISK DRIVE PERFORMANCE QUALITY, OPTICAL DISK DRIVE, OPTICAL DISK DUPLICATOR SYSTEM AND COMPUTER PROGRAM PRODUCT

(75) Inventors: Johannes Leopoldus Bakx, Eindhoven (NL); Edwin Johannes Maria Janssen, Eindhoven (NL)

(73) Assignee: Lite-On It Corporation, Taipei (TW)

( * ) Notice: Subject to any disclaimer, the term of this patent is extended or adjusted under 35 U.S.C. 154(b) by 973 days.

(21) Appl. No.: 12/122,820

(22) Filed: May 19, 2008

(65) Prior Publication Data

US 2009/0285072 A1 Nov. 19, 2009

(51) Int. Cl.
*G11B 7/00* (2006.01)

(52) U.S. Cl. .................................. 369/116; 369/53.26

(58) Field of Classification Search ............... 369/53.26, 369/53.27
See application file for complete search history.

(56) References Cited

U.S. PATENT DOCUMENTS

| | | | | |
|---|---|---|---|---|
| 6,967,914 B2* | 11/2005 | Udagawa et al. | ........... | 369/47.51 |
| 2005/0030868 A1* | 2/2005 | Kamon et al. | ............. | 369/53.26 |
| 2006/0002268 A1* | 1/2006 | Seo | ............................. | 369/53.26 |
| 2007/0153654 A1* | 7/2007 | Matsuda | .................... | 369/47.44 |

* cited by examiner

*Primary Examiner* — Adam R Giesy

(74) *Attorney, Agent, or Firm* — McClure, Qualey & Rodack, LLP

(57) ABSTRACT

A method for monitoring an optical disk drive performance quality by determining a laser diode quality indicator for a laser diode arranged in an optical disk drive for scanning an optical disk, includes measuring an actual value of a parameter associated with a laser diode characteristic, obtaining a reference value of the parameter, comparing the actual value with the reference value for obtaining a comparison result, and determining the laser diode quality indicator from the comparison result. The laser diode quality indicator can at least take a warning level signaling a precursor for a defective state of the optical disk drive and an error level signaling a defective state of the optical disk drive. The laser diode characteristic may be a light-current or a voltage-current relationship.

15 Claims, 7 Drawing Sheets

Figure 1:
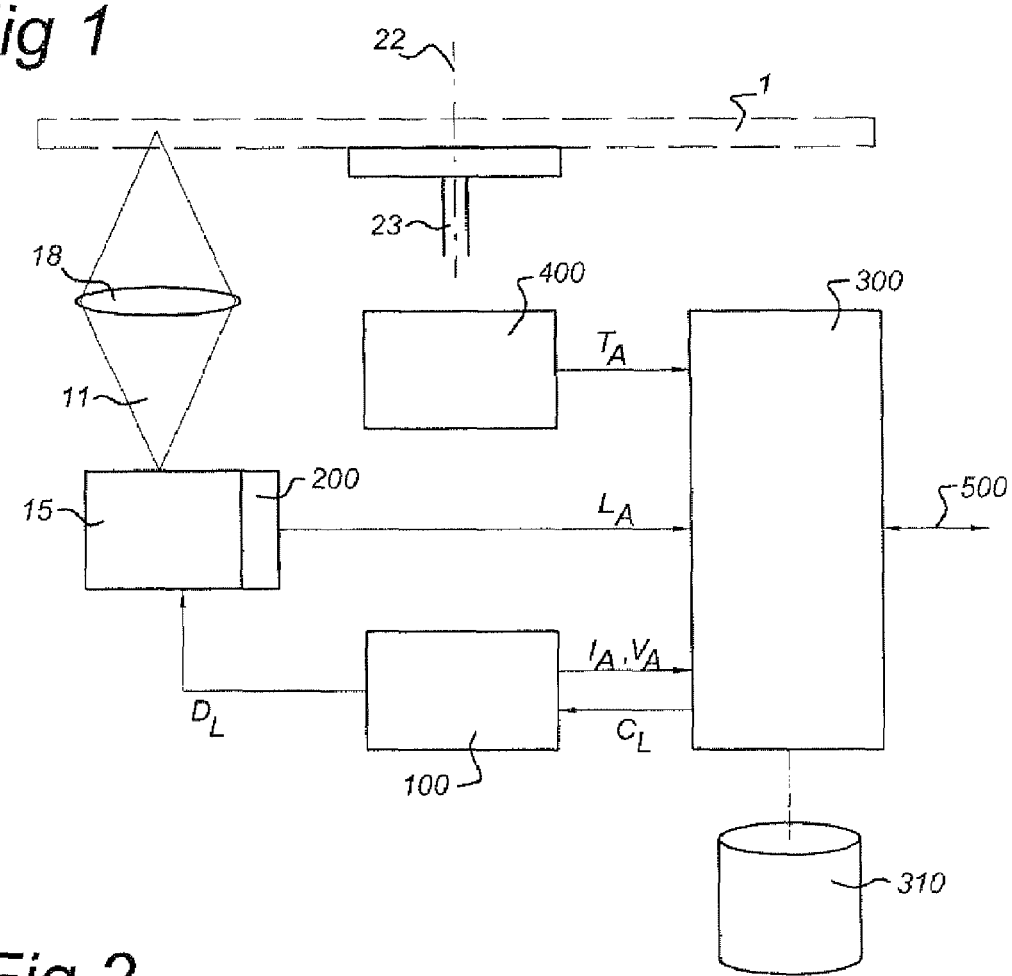

METHOD FOR MONITORING AN OPTICAL DISK DRIVE PERFORMANCE QUALITY, OPTICAL DISK DRIVE, OPTICAL DISK DUPLICATOR SYSTEM AND COMPUTER PROGRAM PRODUCT

FIELD

The invention relates to a method for monitoring an optical disk drive performance quality. The invention further relates to an optical disk drive. The invention further relates to an optical disk duplicator system. The invention further relates to a computer program product.

BACKGROUND

Optical disk drives use a laser diode for generating a laser beam, which is focused by an optical arrangement onto an optical disk for scanning a substantially circular track on the optical disk. The substantially circular track usually has the form of a spiral. For a read-only disk, the track may be a pre-embossed sequence of marks, which may also be referred to as pits, and spaces. The marks and spaces correspond to data stored on the optical disk. For a recordable disk, the track may be a substantially continuous groove, separated by land portions between subsequent turns of the spiral. The recordable disk may allow to write marks in the groove in a recordable layer. Write-once recordable disks allow to write marks, but do not allow to erase marks and overwrite them with new marks. Rewritable recordable disks, also referred to as re-recordable optical disks, allow to write marks, as well as erase marks and overwriting with new marks.

For writing marks on the optical disk, the optical disk drive may be equipped with a laser driver for applying sequences of drive pulses to the laser, resulting in high-power laser pulses, allowing e.g. to form the marks in the recordable layer. The accuracy of writing these marks is dependent on the accuracy of the actually applied laser power. When an incorrect or insufficient laser power is applied, mark formation will not be achieved as intended, e.g. all marks may become too short, and no correct retrieval of data from the disk will be possible. As the output power of a laser diode may vary e.g. due to a varying temperature, the output power of the laser diode is usually monitored and controlled. The optical disk drive usually comprises a sensor for sensing the laser diode output power of the laser beam and adjusting the laser diode output power to achieve a stable laser diode output power when writing marks.

Also when scanning the optical disk for reading the marks and spaces and retrieving the associated data from the marks and spaces, the laser diode output power is usually controlled. The laser diode output power usually shows a threshold current level below which the laser diode output power is marginally and above which the laser diode output power increases strongly, and reading is usually performed with a laser diode output power only closely above to the threshold current level, it is common to also monitor and control the laser diode output power during reading and to thus provide a substantially stable laser diode output power during reading. This power may also be referred to as the read output power.

The monitor and control of the laser output power normally results in a well-defined laser output power, substantially independent of e.g. the temperature of the laser diode and possible other effects effecting the relationship between laser diode output power and laser driving conditions, e.g. laser driving current. However, the monitor and control will not always be able to give a well-defined laser output power. E.g., the driving current may have increased to a level at which the laser diode is damaged and the laser diode is not able to deliver the required output power anymore, resulting in badly recorded disks which cannot be read with a sufficiently low number of errors. Also, the damage to the laser diode may result in e.g. non-linearity of the laser diode output power as a function of driving current, causing the control loop to fail to control sufficiently accurate.

Recording quality may thus decrease and recording with a sufficient quality for correctly reading back the recorded data may eventually fail when the laser diode has degraded. Although an optical disk may still appear be readable immediately after recording with the optical disk drive used for the recording, also when the recording quality is poor, the same optical disk may not be readable in other optical disk drives when the recording quality is poor. Especially in applications where a large value is associated with a recorded optical disk, this may be unacceptable. E.g., when an optical disk is used for personalized sale, where e.g. a specific compilation of content, such as movies, is recorded on a recordable optical disk in a shop and sold for a price similar to that of a pre-embossed read-only disk, the buyer will expect the same quality for the personalized, recordable optical disk as for the pre-embossed read-only disk. Also in archiving applications, either professional or for personal use, the quality of the recorded disk shall be high, and allow reading back the disk correctly on a wide variety of optical disk drives, also at a much later moment in time. A similar requirement is set by disk duplicator farms, which produce copies of a master optical disk by copying them with a farm of optical disk drive on recordable optical disks. Another example is with a so-called Medical Grade Disk, which is an optical disk carrying patient data, e.g. digital X-ray photographs, which need to be reliable recorded and correctly read.

Some known methods test each recorded disk on the quality of the recorded marks. Although this may be a viable solution for some applications, it may be quite cumbersome for others. Improved methods thus aim to prevent recording when the laser diode has degraded, instead of repeating the recording on another optical disk drive when it has been detected that a recording has a poor quality, or even has failed.

A known method aiming to prevent the use of optical disk drives with a degraded performance is to replace an optical disk drive after a pre-determined number of operating hours or a pre-determined number of recording sessions, at which the optical disk drive is expected to still be of sufficient quality. Although this increases the number of correct recordings, the known method has the drawback that still bad recording may arise from optical disk drive that fail earlier than expected. Also, optical disk drives which still function perfectly are replaced, while they might have been used for considerably longer before the recording quality deteriorates.

SUMMARY

The present invention aims to provide a method for monitoring the performance quality of the optical disk drive.

In embodiments of the present invention, the method comprises determining a laser diode quality indicator for a laser diode arranged in an optical disk drive for scanning an optical disk, the determining comprising:
measuring an actual value of a parameter associated with a laser diode characteristic,
obtaining a reference value of the parameter,
comparing the actual value with the reference value for obtaining a comparison result, and determining a laser diode quality indicator from the comparison result.

The laser quality diode indicator provided by the method may thus be used to react with any appropriate reaction when the laser diode quality has started to deteriorate, e.g. by signalling to a user of the optical disk drive that its recordings may no longer be reliable, or is expected to become unreliable in the near future, and replacement of the drive may then be recommended. The method may also be used in the optical disk drive and provide the laser diode quality indicator to e.g. a user or a computer comprising the optical disk drive.

The laser diode characteristic may e.g. be the laser diode output power as a function of an operating current, the parameter may e.g. be a threshold current of the laser diode characteristic, and the actual value of the parameter may be the threshold current level while the optical disk drive is operated under actual operating conditions.

In an example, the reference value of the parameter may e.g. be an expected value of the threshold current level, taking into account the actual environmental conditions such as temperature. The reference value may e.g. be obtained from a formula modeling the laser diode characteristic and using parameter values determined during manufacturing of the disk (so-called time-zero parameter values).

The comparison may e.g. comprise determining the difference between the actual value and the reference value.

Determining the laser diode quality indicator may e.g. be performed in between multiple recordings on a single disk or in between recordings on a first disk and a second disk.

Determining the laser diode quality indicator may alternatively be performed while scanning an optical disk, e.g. while reading data from the optical disk or while writing data to the optical disk.

The reference value may be a fixed value for the optical disk drive. The reference value may alternatively take a value selected from at least two different values in dependence on e.g. an operating condition. The reference value may e.g. take a value out of a plurality of values. The reference value may e.g. take a value selected from a range.

The reference value may be determined during manufacturing of the optical disk drive in a factory calibration procedure. Alternatively, the reference value may be determined during use of the optical disk drive.

Obtaining the reference value may comprise modeling the value of the parameter for an operating condition of the laser diode. The modeling may be performed as part of the method, or may be performed separately, with the modeling results being provided as e.g. a lookup-table or a parameterization as a function. Obtaining the reference value may then comprise retrieving from the lookup table, or evaluating the value of the function.

In embodiments, the reference value is obtained from an operating condition, such as a temperature, e.g. an ambient temperature or a temperature measured in the optical disk drive.

In embodiments, the laser diode quality indicator comprises a precursor signal indicative of an expected future defective state of the laser diode.

The precursor signal may thus signal a precursor for a defective state of the optical disk drive. The precursor signal may provide a warning to e.g. a user, when the laser diode quality is detected to deteriorate and a failure of the laser diode may be expected shortly.

In embodiments, the laser diode quality indicator comprises an error signal indicative of an actual defective state of the laser diode.

The error signal may thus signal the occurrence of an error to e.g. a user, e.g. when the laser diode quality has become too bad for further reliable use of a specific operating mode or for any further use.

The precursor signal and the error signal may be combined in a single indicator signal having an indicator signal value selected from at least a warning level and all error level, the warning level corresponding to an expected future defective state of the laser diode, and the error level corresponding to an actual defective state of the laser diode.

The laser diode quality indicator may e.g. set to a warning level when the comparison result is between a first and a second threshold comparison value. The warning level may indicate that the recording quality may deteriorate shortly, thus providing an early warning to the user. Additionally, the laser diode quality indicator may e.g. be set to an error level when the comparison result exceeds a third threshold comparison value. The error level may indicate that it is likely that the recording quality will be deteriorated when use of the optical disk drives is continued, hence that the optical disk drive can no longer be used reliably in a specific operation mode or no longer be used at all.

In embodiments of the method,
comparing the actual value with the reference value for obtaining a comparison result comprises determining the comparison result from a difference between the actual value with the reference value, and
determining the laser diode quality indicator from the comparison result comprises:
setting the laser diode quality indicator to a first quality level when the difference between the actual value with the reference value exceeds a first threshold.

In further embodiments, determining the laser diode quality indicator from the comparison result further comprises:
setting the laser diode quality indicator to a second quality level when the difference between the actual value with the reference value exceeds a second threshold, the second threshold being larger than the first threshold.

In further embodiments,
obtaining the reference value of the parameter comprises:
measuring a first value of the parameter at a first moment in time,
storing the value of the parameter, and
retrieving the value of the parameter as the reference value of the parameter; and
measuring the actual value of the parameter is performed at a second moment in time, the second moment in time being later than the first moment in time.

Comparing the actual value with the reference value for obtaining the comparison result may then comprise determining a difference between the actual value and the reference value.

Determining the laser diode quality indicator from the comparison result may then e.g. comprise setting the laser diode quality indicator to a value associated with the warning level when the difference indicates that the value of the parameter has increased with an unexpectedly large amount. E.g., the threshold current level of the laser diode may have increased significantly while only a marginal increase was to be expected in the time interval between the first and the second moment in time, whereas the laser diode is still capable of providing all laser output power levels required for scanning the optical disk. Such a situation may however be a forerunner of a severe failure, and the warning level may be used as an early warning allowing to react with any appropriate reaction before the laser diode behaves erroneous.

Determining the laser diode quality indicator from the comparison result may then e.g. comprise setting the laser diode quality indicator to a value associated with the error level when the difference indicates that the value of the parameter has increased with an unacceptably large amount. This may indicate that the laser diode is severely damaged and has effectively reached its end-of-life. E.g., the threshold current level of the laser diode may have increased strongly while only a small increase was to be expected, and the laser diode is no longer capable of providing all laser output power levels required for scanning the optical disk. Such a situation is a severe failure.

As some parameters of laser diode characteristic may depend on the temperature of the laser diode, ignoring the temperature dependence might result in setting the quality parameter indicator to either a too optimistic or a too pessimistic value, i.e. in a false positive or false negative qualification. A too optimistic value might e.g. result in a continued use of a deteriorated laser, whereas a too pessimistic value might e.g. result in prohibiting the use of laser that is still in a sufficiently good condition. Correction the reference value for the temperature dependence of the parameter is then advantageous and may reduce the number of false positive or false negative qualifications.

In embodiments, obtaining the reference value of the parameter comprises:
 obtaining an initial value of the parameter associated with an initial operating temperature,
 measuring an actual operating temperature, and
 determining the reference value of the parameter from at least the initial value of the parameter, the initial operating temperature and the actual operating temperature.

In obtaining the reference value and comparing the actual value with reference value, the reference value is thus corrected for temperature effects.

In embodiments, measuring the actual value of the parameter comprises:
 acquiring an actual uncorrected value of the parameter associated with an actual operating temperature,
 measuring the actual operating temperature,
 obtaining a reference temperature, and
 determining the actual value of the parameter from at least the actual uncorrected value of the parameter, the actual operating temperature and the reference temperature.

In obtaining the actual value and comparing the actual value with reference value, the acquired actual value is thus corrected for temperature effects.

In embodiments, the laser diode characteristic is a light-current relationship between laser diode light output levels and corresponding laser diode operating current levels.

In embodiments, the parameter is associated with at least a threshold current level associated with the light-current relationship.

In embodiments, the parameter is associated with at least an operating current level corresponding to a pre-determined laser diode light output level.

In embodiments, the parameter is associated with at least an operating current level associated with the light-current relationship.

In embodiments, the parameter is associated with at least a slope value associated with a slope of a linear segment of the light-current relationship.

In embodiments, the parameter is associated with at least an end value associated with an end of the linear segment of the light-current relationship.

In embodiments, the parameter is associated with at least a kink associated with the light-current relationship.

The parameter may represent whether a kink is either present or absent in the light-current relationship.

Alternatively or additionally, the parameter may e.g. be associated with a lower range of the kink, e.g. expressed as a laser diode current level at which the kink starts or a laser diode light output level at which the kink starts. The presence of a kink may e.g. be detected from detecting a change of slope of the light-current relationship, e.g. by determining a change of a first derivative of the slope.

In embodiments, the laser diode characteristic is a voltage-current relationship between laser diode forward voltage levels and corresponding laser diode operating current levels.

In embodiments the parameter is associated with at least an operating laser diode forward voltage level corresponding to a pre-determined laser diode operating current level.

The actual value may be the actual forward voltage level associated with a specific operating current level of the laser diode, e.g. the threshold current level or the read current level, during use.

The reference value may be an initial forward voltage level determined at the specific current level in a calibration procedure during manufacturing of the optical disk drive.

When the laser diode quality deteriorates, the forward voltage level may increase with a significant amount, such an increase being a precursor of a failure of the laser diode. The laser diode quality indicator may thus be determined from the comparison of the actual forward voltage level with the initial forward voltage level.

In embodiments, the parameter is associated with at least an operating laser diode forward voltage level corresponding to a pre-determined laser diode light output level.

In embodiments, the parameter is associated with at least a diode forward voltage level corresponding to a threshold diode voltage level of the voltage-current relationship.

As the laser diode acts as a diode, the voltage-current relationship shows a threshold behaviour: the current level remains substantially zero below the threshold diode voltage level, and strongly increase when the forward voltage is increased above the threshold diode voltage level. When the laser diode deteriorates, the threshold diode voltage level may suddenly increase.

In embodiments, measuring the actual value of the parameter is performed without focusing on an optical disk with the optical disk drive.

The optical disk may be absent from the optical disk drive. The optical disk may be inserted in the optical disk drive, but be far out of focus.

This prevents possible damage to the optical disk, which might occur when a large laser output power is delivered to the optical disk while measuring on e.g. the light-current relationship.

In embodiments, the method further comprises determining a recommendation signal from the laser diode quality indicator.

The recommendation signal may e.g. correspond to signaling that the laser diode quality indicator comprises either a) a safe level, b) a warning level or c) an error level. These levels may e.g. correspond respectively to a) a well-functioning laser diode which allows a continued operation without any further measures, b) to the laser diode quality being at a "risky" level, allowing to temporally continue, but recommending a replacement when convenient or as soon as reasonably possible, possible, and c) the laser diode quality being bad, requiring that no further recordings should be made and an immediate replacement is required.

In further embodiments, the method further comprises providing the recommendation signal to an indicator device. The indicator device may be able to indicate to an operator whether the optical disk drive needs to be replaced.

In embodiments, the operator may be a human. In embodiments, the operator may be a device, such as a master controller or a host computer.

In embodiments, the method further comprises determining a maximum laser power value from the laser diode quality indicator.

Determining the maximum laser power value may be performed for a specific recording speed. Determining the maximum laser power value may comprise determining a plurality of maximum laser power values for corresponding recording speeds for a plurality of recording speeds.

In embodiments, the method further comprises determining an operating mode from a set of operating modes for the optical disk drive from at least the laser diode quality indicator.

The method may further comprise selecting the determined operating mode and operating the optical disk drive with the determined operating mode.

The method may further comprises determining a first subset of supported operating modes from the set of operating modes and a second subset of non-supported operating modes.

The second subset of non-supported operating modes may e.g. comprises all operating modes that would result in a warning and/or an error level of the laser diode quality indicator, whereas the first subset of supported operating modes may comprises all other operating modes that the optical disk drive can support.

In further embodiments, the method comprises determining the operating mode for the optical disk drive from at least one of the maximum laser power value and the laser diode quality indicator.

The operating mode may e.g. relate to supported recording speeds. The operating mode may e.g. relate to whether recording on multi-layer optical disks is supported or not. The operating mode may e.g. relate to which disk types (e.g. one-time writable and/or rewritable; or e.g. disk types from specific manufacturers) are supported, or to which disk generations (CD, DVD, Blu-Ray Disk) are supported.

The operating mode may e.g. relate to a read-only mode, and the method may comprise switching to the read-only mode, thus disabling further recordings with the optical disk drive on the optical disk or disabling any further recordings with the optical disk drive on any optical disks.

The method may alternatively or additionally comprise determining a maximum recording speed from at least one of the maximum laser power value and the laser diode quality indicator.

Lower recording speeds with the same optical disk generally need a lower laser power. Lowering the recording speed may thus result in using the laser diode in a power region which is less likely to further harm the laser.

The present invention further aims to provide a method for interacting with an optical disk drive comprising a laser diode for scanning an optical disk.

Hereto the method according to the present invention comprises:

obtaining a monitor signal with a monitor signal value associated with a laser diode quality from the optical disk drive,
  choosing a reaction from a set of pre-determined reactions in dependence on the monitor signal value, and
  executing the reaction.

The method may e.g. be used in an application running on a host apparatus, e.g. a software program running on a computer allowing the user to compile a set of recording data and record the set of recording data to the optical disk using the optical disk drive. The method may e.g. be used for monitoring the quality of the laser diode in the optical disk drive.

The monitor signal may be a signal on a control bus between drive and host for exchanging the monitor signal value, a signal writing the monitor signal value to a register in the drive or in the host, or a signal reading the monitor signal value from a register in the drive or in the host.

The monitor signal may be derived from the laser diode quality indicator determined with any one of the methods described above. The monitor signal value may be a direct representation of the laser diode quality indicator, or a derived value.

The set of predetermined reactions may comprise at least one or more reactions from the group of:

a) signaling to an operator whether the optical disk drive needs to be replaced,
  b) signaling to an operator whether a performance level may be at risk,
  c) adjusting an operating mode of the optical disk drive,
  d) signaling to an operator a reduced subset of supported operating modes,
  e) adjusting a recording speed of the optical disk drive,
  f) ejecting the optical disk from the optical disk drive, and
  g) prohibiting further recordings with the optical disk drive.

The one or more reactions may further comprise any reaction that the skilled person may find effective in a situation corresponding to specific value of the laser diode quality indicator.

The reactions a-g may be used individually and/or in any combination.

The method may thus e.g. prevent the use of the optical disk drive for recording on the optical disk with likely deteriorated performance.

The reactions may be related to the use of the optical disk drive with a specific individual optical disk, e.g. the optical disk that is present on the optical disk drive, or be related to the use of the optical disk drive with any optical disk. E.g., the operator may be signaled that the performance level is at risk for recording on a specific optical disk as the specific optical disk requires a write power level that can no longer be provided by the laser diode, whereas the performance level is not at risk when recording on an other optical disk requiring a significantly smaller write power level.

The operator may be a person operating a computer executing a computer program product for writing data onto the optical disk. The computer program product may execute the method and thus choose and execute the reaction. The signaling may comprise showing a message, e.g. in a pop-up screen, associated with the one or more reactions.

The adjusting of the operating mode and/or the recording speed may be performed by the computer executing the computer program product.

In further embodiments, the optical disk drive is arranged to be operated in a network with at least one further optical disk drive and the set of pre-determined reactions comprises at least one or more reactions from the group of:

a) removing the optical disk drive from the network, and
  b) replacing the optical disk drive with a backup optical disk drive in the network.

In a further aspect, the present invention relates to an optical disk drive for scanning an optical disk arranged to monitor the performance quality of the optical disk drive.

Hereto the optical disk drive according to the present invention comprises:

a laser diode for generating a laser beam arranged in the optical disk drive for scanning an optical disk, a laser diode driver for operating the laser diode according to a laser diode operating setting associated with a laser diode characteristic, a sensor arranged for sensing the laser beam and for producing a sensor output signal, and a laser diode quality monitor arranged to determine a laser diode quality indicator by at least:

receiving the sensor output signal from the sensor, obtaining the laser diode operating setting from the laser diode driver, measuring an actual value of a parameter associated with the laser diode characteristic from at least one of the sensor output signal and the laser diode operating setting, obtaining a reference value of the parameter, comparing the actual value with the reference value for obtaining a comparison result, and determining a laser diode quality indicator from the comparison result.

The optical disk drive may thus give e.g. an early warning when the laser diode quality has deteriorated, and allow a user and/or the drive itself to act accordingly.

In embodiments of the optical disk drive, the laser diode quality indicator comprises a precursor signal indicative of an expected future defective state of the laser diode.

In embodiments, the laser diode quality indicator comprises an error signal indicative of an actual defective state of the laser diode.

In further embodiments of the optical disk drive, the laser diode quality indicator has an indicator value selected from at least a warning level and an error level.

The warning level may indicate a precursor for a defective state of the optical disk drive, and The error level may indicate a defective state of the optical disk drive.

The indicator may further comprise an explicit flag indicating that the defective state relates to the laser in the optical disk drive. This allows a user who observes the warning level to recognize the origin of the detective state.

In further embodiments of the optical disk drive, obtaining the reference value of the parameter comprises
measuring a value of the parameter at a first moment in time, and measuring the actual value of the parameter is performed at a second moment in time, the second moment in time being later than the first moment in time.

In further embodiment, the optical disk drive further comprises:

a temperature sensor for determining an actual operating temperature, and a reference calculator for determining the reference value of the parameter, the reference calculator being arranged to:

obtain an initial value of the parameter associated with an initial operating temperature, obtain the actual operating temperature from the temperature sensor, and determine the reference value of the parameter from at least the initial value of the parameter, initial operating temperature and the actual operating temperature.

In a further aspect, the present invention relates to an optical disk duplicator system, also referred to as a farm, arranged for monitoring the performance quality of the optical disk duplicator system.

Hereto, the optical disk duplicator system comprises at least one optical disk drive as described above.

In further embodiments, the optical disk duplicator system further comprises monitor unit, the monitor unit being arranged to:

obtain at least one monitor signal associated with a corresponding laser diode quality from each of the at least one optical disk drive, determine from the at least one monitor signal whether one of the at least one optical disk drive needs to be removed from the optical disk duplicator system, and if so, signal which of the at least one optical disk drive needs to be removed from the optical disk duplicator system.

If so, an operator may remove the optical disk drive that needs to be removed from the optical disk duplicator system.

If so, the duplicator system may already exclude the optical disk drive from being used, before the actual physical removal and also when no physical removal is performed at all.

After removal of an optical disk drive from the optical disk duplicator system, the operator may add a new optical disk drive replacing the removed optical disk drive.

In alternative further embodiments, the optical disk duplicator system. Further comprises a monitor unit the monitor unit being arranged to:

obtain at least one monitor signal associated with a corresponding laser diode quality from each of the at least one optical disk drive, determine an operating mode from the at least one monitor signal for each of the at least one optical disk drive, and operate the at least one optical disk drive with the corresponding operating mode.

The monitor unit may determine from the at least one monitor signal whether an operating mode has to be adjusted for one of the at least one optical disk drive, adjust the mode and use the adjusted mode.

In a further aspect, the present invention relates to a computer program product arranged to be loaded in a processor associated with an optical disk drive and after being loaded allowing the processor to carry out one of the methods described above.

In a further aspect, the present invention relates to a computer program product arranged to be loaded in a processor associated with a host device comprising an optical disk drive and after being loaded allowing the processor to carry out one of the methods described above.

The embodiments described above may be used individually. The embodiments may be combined. Where a set of alternatives are given within a single embodiment, embodiments with a subset of the set of alternatives are meant to be included with the scope of the invention.

SHORT DESCRIPTION OF FIGURES

Figure 2:
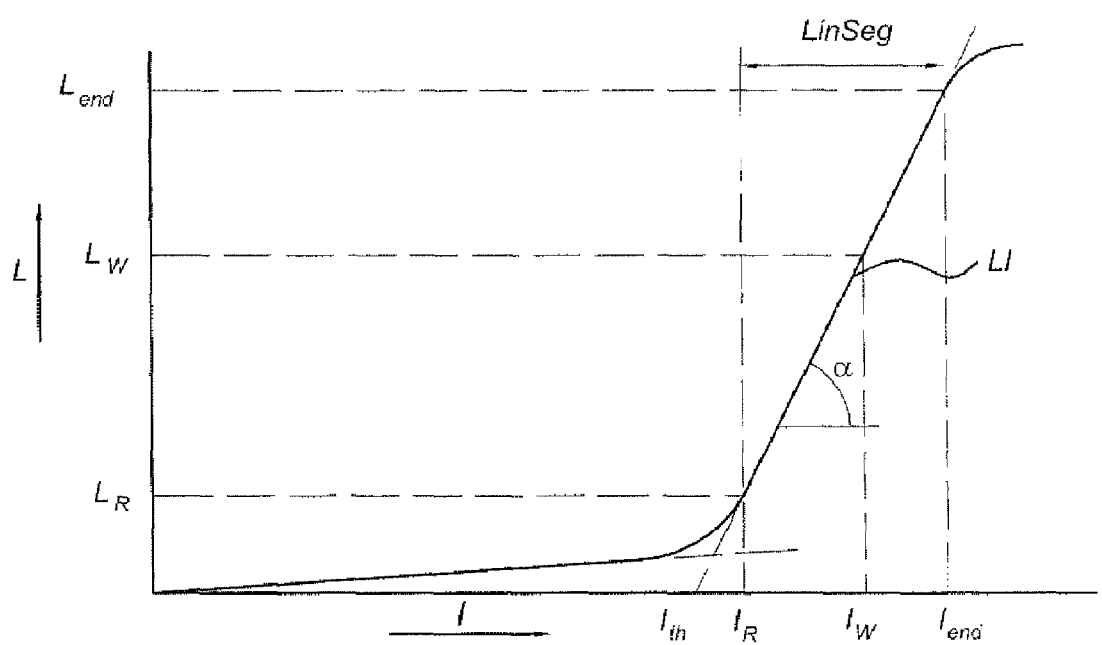
Figure 3:
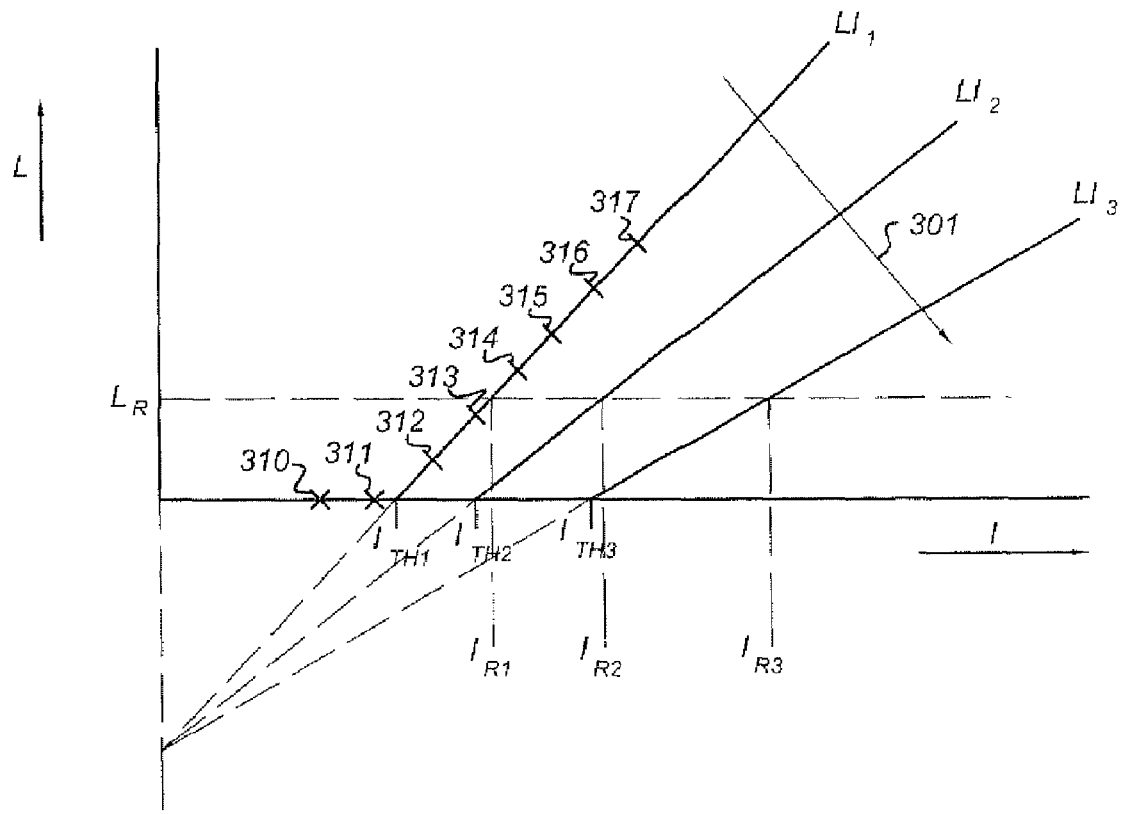
Figure 4:
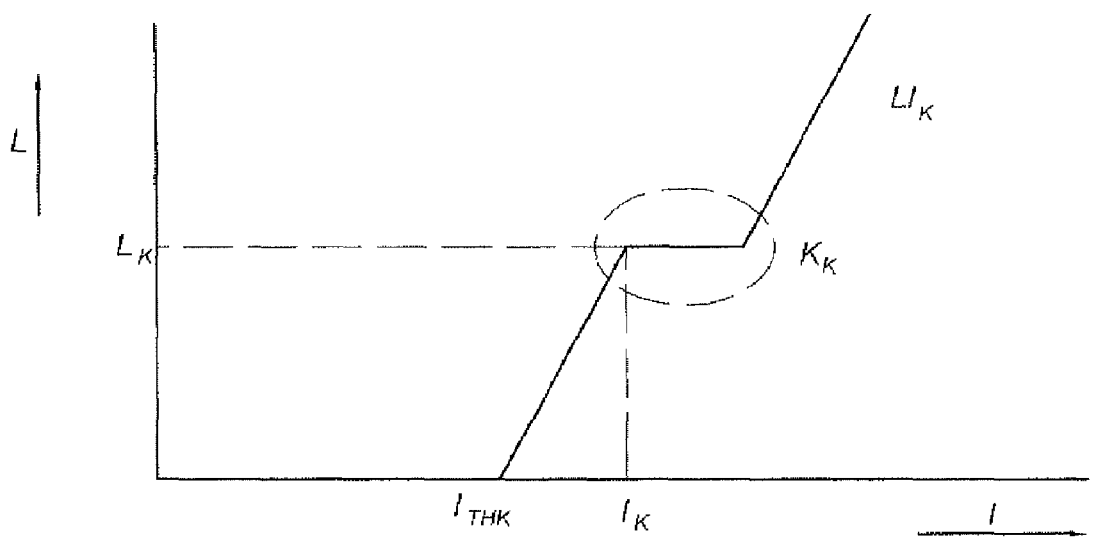
Figure 5:
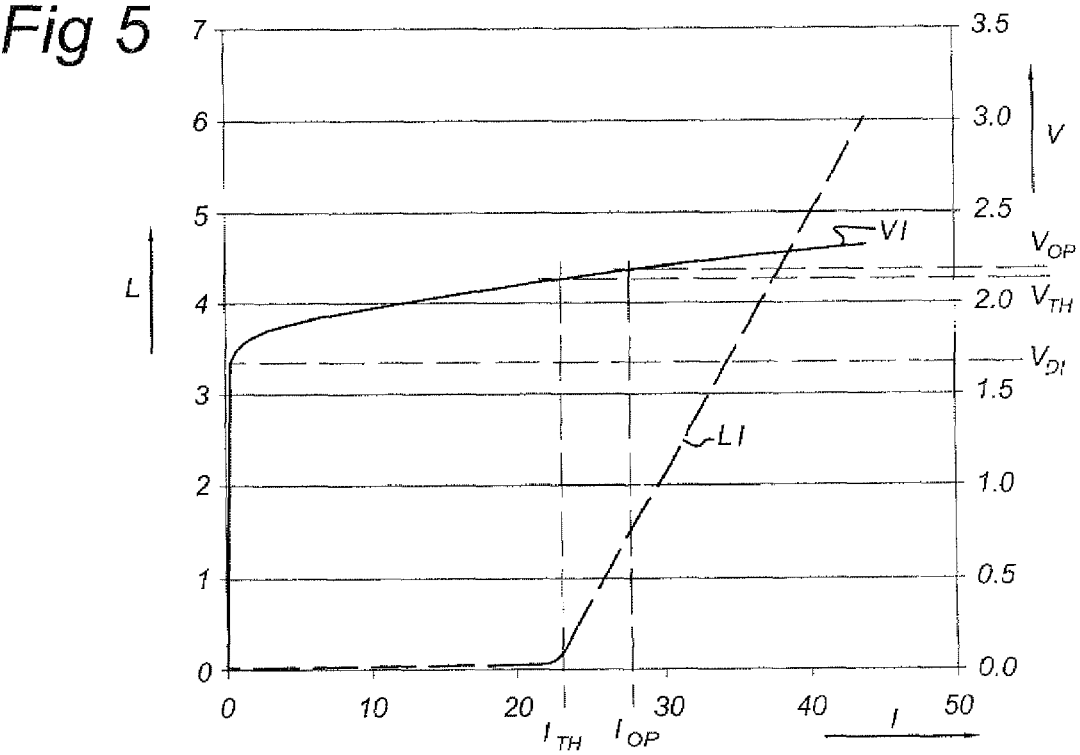
Figure 6:
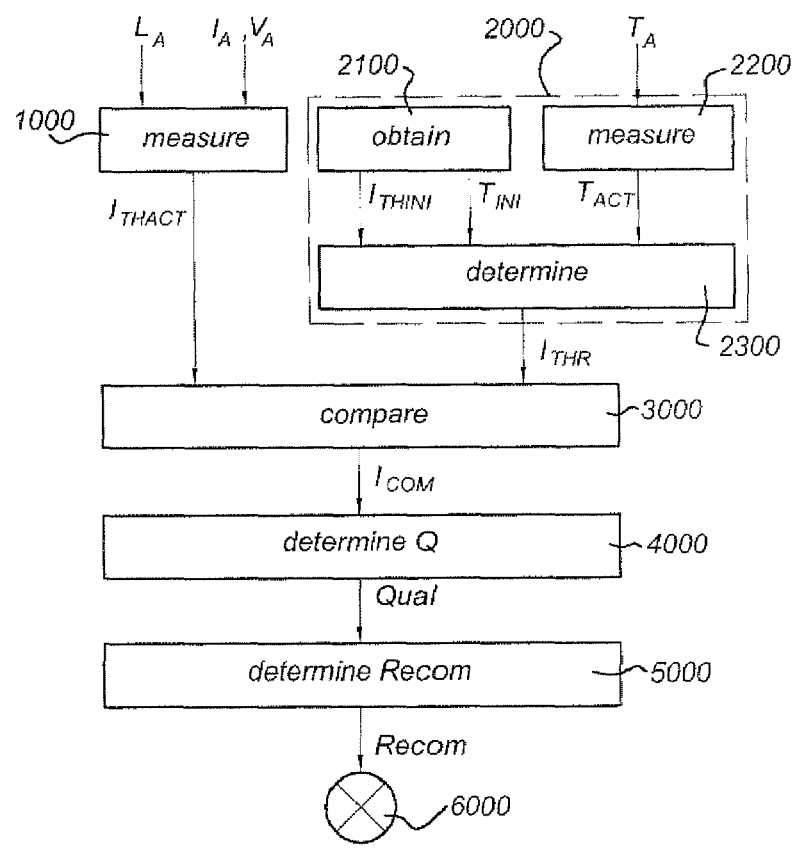
Figure 7:
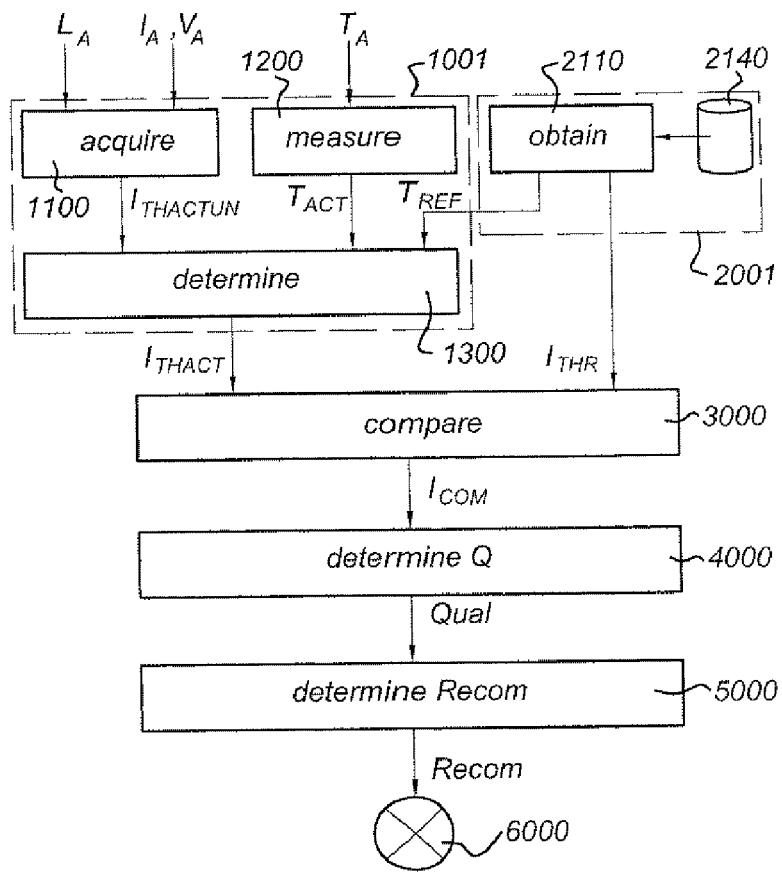
Figure 8:
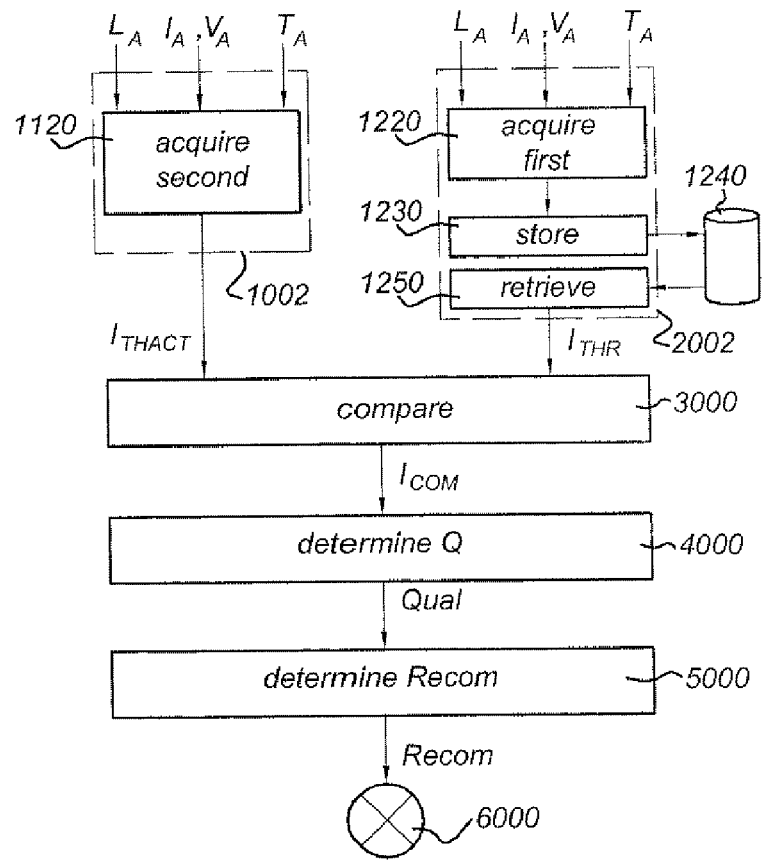
Figure 9:
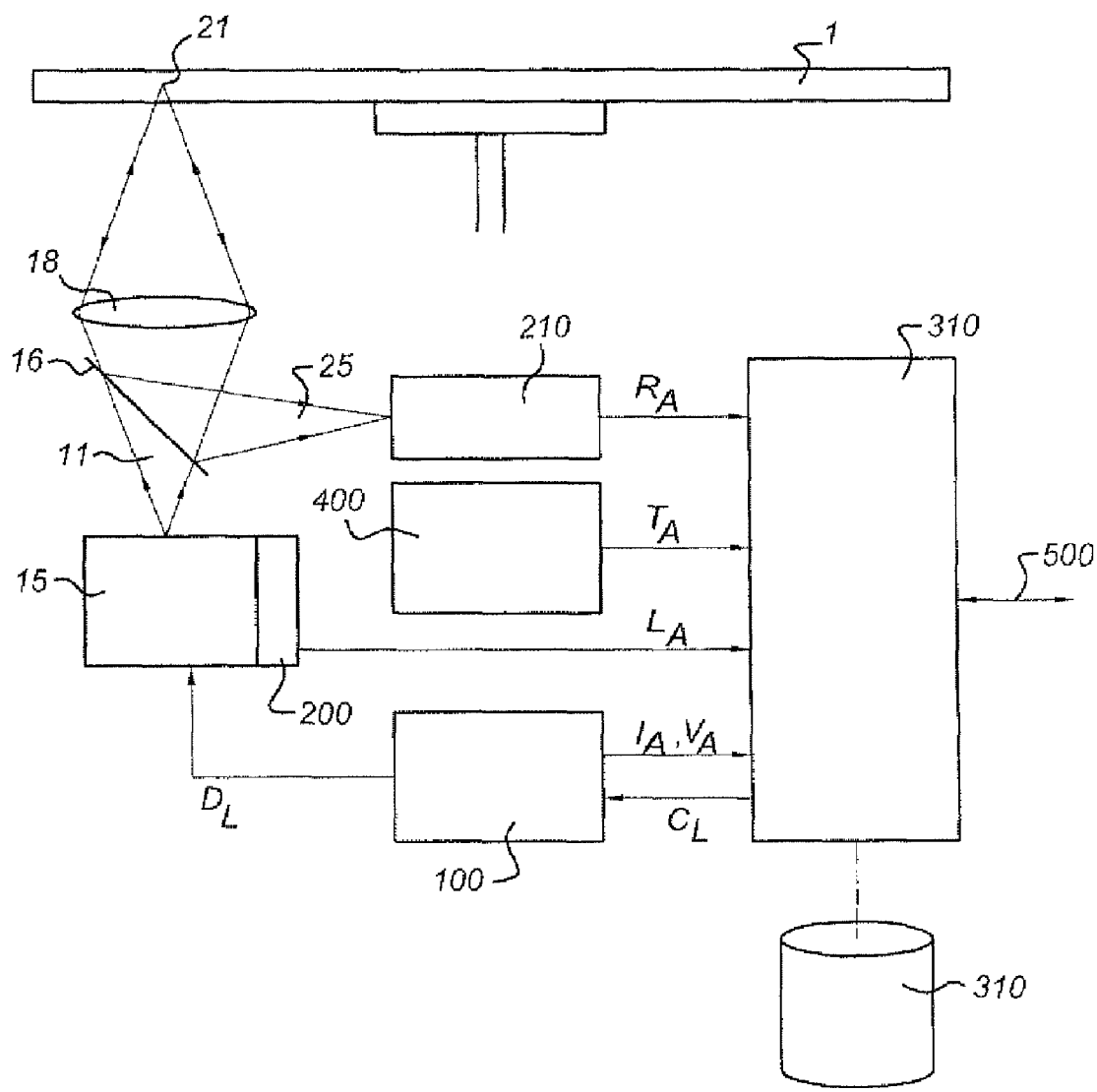
Figure 10:
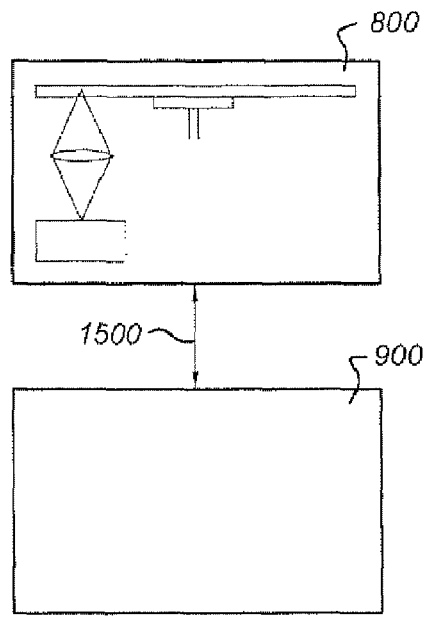
Figure 11:
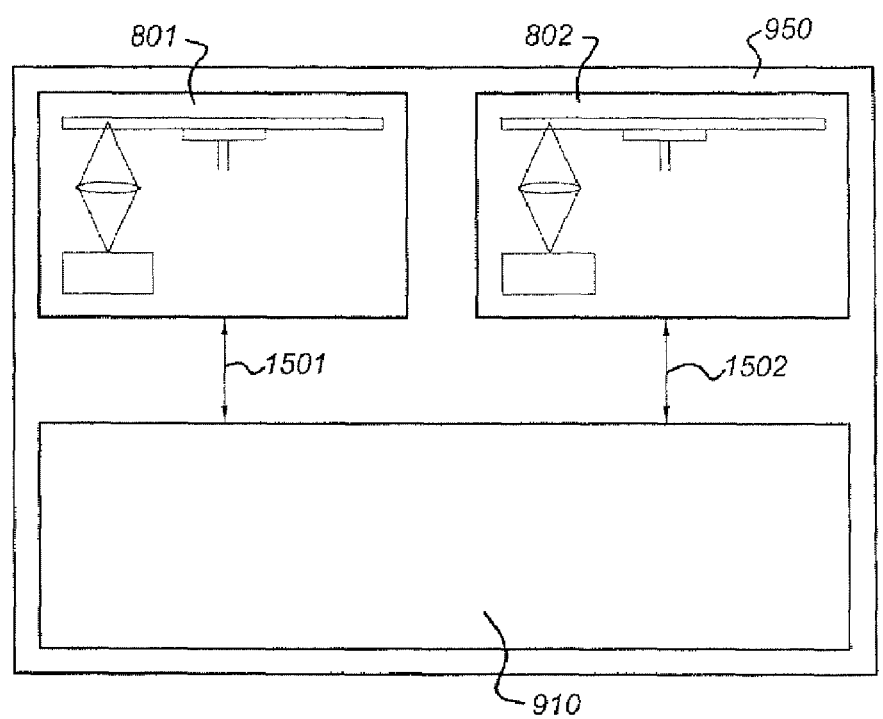
Figure 12:
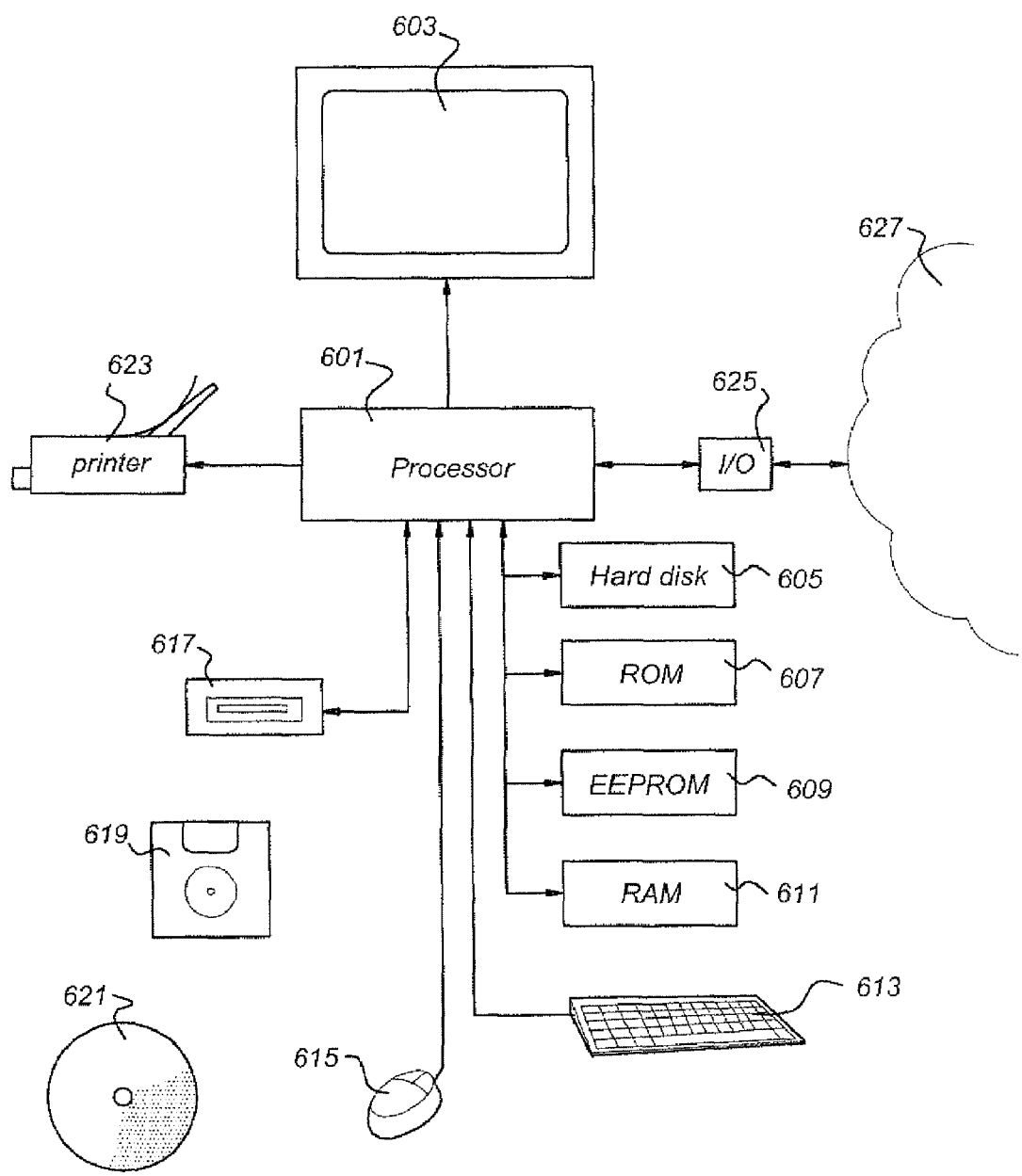

These and other aspects of the invention will be further elucidated and described in detail with reference to the drawings, in which corresponding reference symbols indicate corresponding parts:

FIG. 1 schematically shows a simplified embodiment of an optical disk drive according to the invention;

FIG. 2 schematically shows a light-current relationship associated with a laser diode and associated parameters;

FIG. 3 schematically shows measurements of the light-current relationship for a laser diode at three different temperatures;

FIG. 4 schematically shows a light-current relationship associated with a kink;

FIG. 5 schematically shows a voltage-current relationship associated with a laser diode and associated parameters;

FIG. 6 schematically shows an embodiment of a method according to the invention;

FIG. 7 schematically shows another embodiment of a method according to the invention;

FIG. 8 schematically shows another embodiment of a method according to the invention;

FIG. 9 schematically shows another simplified embodiment of an optical disk drive according to the invention;

FIG. 10 schematically shows interacting between an optical disk drive according to the invention and a host controller;

FIG. 11 schematically shows an embodiment of a disk duplicator system according to the invention;

FIG. 12 schematically shows an overview of a computer arrangement that can be used to carry out the method according to the invention.

DETAILED DESCRIPTION

FIG. 1 schematically shows a simplified optical disk drive. The optical disk drive is arranged to receive an optical disk 1. A laser diode 15 is arranged for generating a radiation beam 11. When an optical disk is present in the optical disk drive, an optical arrangement 18 may focus the radiation beam 11 on the optical disk. The optical disk drive will be described below while performing an embodiment of a method according to the invention.

The laser diode 15 is operated from a laser driver 100 with laser diode operation conditions $D_L$, generated by the laser driver 100 from laser control signals $C_L$, generate by a controller 300. The laser diode operation conditions $D_L$ comprise an operating current I with an operating current level $I_{OP}$ and an operating voltage with an operating voltage level $V_{OP}$. The laser driver 100 also provides an actual value $I_A$ of the operating current level $I_{OP}$ and, optionally, an actual value $V_A$ to the controller 300.

A sensor 200 is arranged to receive a fraction of the light generated by the laser diode 15. The sensor may be a forward-sense sensor arranged to receive a fraction of the radiation beam 11, e.g. a fraction that is outside a pupil of the optical arrangement. The sensor may also be an alternative sensor, such as a laser diode monitor sensor arranged in a housing of the laser diode as is used in some commercially available laser diodes. The sensor 200 provides a representative measure of the actual value $L_A$ of the laser diode output power $L_{OP}$ to the controller 300.

The optical disk drive further comprises a temperature sensor 400 arranged to measure an actual temperature in the optical disk drive and to provide the measurement of the actual temperature $T_A$ to the controller 300.

The controller 300 is arranged to communicate with external devices via a bus 500. The bus may e.g. be used to receive a read-command indicating that the optical disk drive needs to read data from the optical disk, or to receive a write-command indicating that the optical disk drive needs to write data, also provides via bus 500, to the optical disk.

FIG. 2 schematically shows an example of a laser diode characteristic. The characteristic shown in FIG. 2 is the light-current relationship LI associated with the laser diode and associated parameters.

The horizontal axis shows the operating current level I. The vertical axis shows the laser diode light output power level, which may also be referred to as the laser diode output power level, the laser output power level, the light output level or the output power level.

The light-current relationship LI may be parameterized with a variety of parameters.

Initial values of one or more of the parameters may be determined e.g. during manufacturing of the optical disk drive, e.g. from a calibration of the laser diode output power level. The calibration may include effects of the sensor 200. The calibration of the laser diode output power level may comprise measuring and storing the light-current relationship LI at an initial temperature, or at a plurality of initial temperatures. Storing may be performed e.g. as a lookup-table or as a parameterization of the light-current relationship LI. Storing may comprise storing the absolute laser diode output power level measured with a calibrated sensor during calibration together with the corresponding representative measure of the actual value $L_A$ provided by the sensor 200.

The threshold current level $I_{TH}$ is the operating current level at which a strong increase in light output starts, i.e. where the laser diode starts lasering operation. Below threshold current level $I_{TH}$, the laser diode emits substantially zero or only a very little amount of light.

The read current level $I_R$ is the operating current level used when reading an optical disk with a laser diode output power level $L_R$. The laser diode output power level $L_R$ and the corresponding signal level provided by the sensor 200 may e.g. be determined during the calibration during optical disk drive manufacturing.

The write current level $I_W$ is the operating current level used when writing an optical disk, with a laser diode output power level of $L_W$. The write current level $I_W$ may be optimized in an optimal power calibration procedure for each individual optical disk, but may also be retrieved from a drive memory 310.

The light-current relationship LI shows a linear segment LinSeg from approximately the threshold current level $I_{TH}$ up to an end current level $I_{END}$ with an end output power level $L_{END}$. The linear segment LinSeg has a slope α, which may also be referred to as a differential efficiency.

FIG. 3 schematically shows three measurements of the light-current relationship $LI_1$, $LI_2$, $LI_3$ for a laser diode at three different temperatures $T_1$, $T_2$, $T_3$, where $T_1<T_2<T_3$, as denoted by arrow 301

A plurality of actual measurement points is shown for the first light-current relationship $LI_1$ as points 310-317, each showing a laser light output level L for a corresponding operating current I. The threshold current level $I_{TH1}$ may easily be determined from these measurement points. Also the actual value of the read current $I_{R1}$ corresponding to a read output power $L_R$ at temperature $T_1$ is shown.

It is observed that the threshold current level $I_{TH1}$, $I_{TH2}$, $I_{TH3}$ increases with increasing temperature $T_1$, $T_2$, $T_3$, as is the read current level $I_{R1}$, $I_{R2}$, $I_{R3}$, Whereas the slope is decreasing.

These dependencies on temperature may be determined for each laser diode type or each individual laser diode, and stored in the controller 300, allowing to determine a reference value at any temperature, e.g. at the same temperature as the actually measured value for the parameter, for a well-functioning laser diode.

When the laser diode is damaged, or close to its end-of-life, the actual value of the parameter, e.g. the actual value of the threshold current level $I_{TH1}$ and the value expected from its initial value and the actual temperature are very different.

FIG. 4 schematically shows another measurement of the light-current relationship $LI_K$. The measurement shows a kink $K_K$, starting at a kink current level $I_K$ and a laser diode output power $L_K$. The presence of such a kink indicated that some damage has been done to the laser, e.g. due to an electrostatic discharge. Although it may seem that the laser diode may still be operated without substantial problems below the kink current level $I_K$, the laser diode can not be considered very reliable anymore when such a kink has appeared and the risk for a more severe failure may be large.

FIG. 5 schematically shows another example of a laser diode characteristic. FIG. 5 shows a voltage-current relationship VI. For reference, also the light-current relationship LI is shown in the same figure.

The horizontal axis shows the operating current level I. The vertical axis on the left shows the laser diode light output power level L for reference. The vertical axis on the right shows the forward voltage level V.

The voltage-current relationship VI shows a diode-type behaviour: below a threshold diode forward voltage level $V_{Df}$, the current level I is substantially zero as is the light output L. When increasing the forward voltage level above the threshold diode forward voltage level $V_{Df}$, the current level is increasing while the light level is increasing only marginally up to a threshold forward voltage level $V_{TH}$, corresponding to the threshold current level $I_{TH}$, at which the laser diode changes from a light-emitting-diode type light emission to a laser type light emission. An operating current Iop, and corresponding operating voltage $V_{OP}$ are also indicated.

When the laser diode quality deteriorates, and especially when the laser diode is damaged, the threshold diode forward voltage level $V_{Df}$ and the threshold forward voltage level $V_{TH}$ typically increase significantly.

FIG. 6 schematically shows an embodiment of a method according to the invention. The method will be explained using the light-current relationship LI as the laser diode characteristic, the threshold current level as the parameter and the value of the threshold current level as the actual value. It will be understood by the skilled person skilled that also other parameters and characteristics may be used, such as for example the ones discussed above with reference to FIG. 2-FIG. 5. E.g., the read current level $I_R$ for obtaining an substantially constant laser diode read output level $L_R$ may be used in stead of the threshold current level.

The method may be performed by the controller 300 in the optical disk drive, or by an external apparatus, such as a programmable processor, communicating with the optical disk drive and the controller 300.

In block 1000, the actual laser light output level $L_A$, the actual laser current level $I_A$, and, optionally, the laser voltage level $V_A$, are measured. In this example, the actual laser light output level $L_A$ is measured for a plurality of corresponding actual laser current level $I_A$ for obtaining measurement values like the ones 310-317 shown in FIG. 3. The actual threshold current level $I_{THACT}$ is determined from the measurement values.

In block 2000, a reference value $I_{THR}$ is obtained from an initial threshold value $T_{THINI}$, an initial temperature $T_{INI}$ and an actual temperature $T_{ACT}$. The initial threshold value $I_{THINI}$ is obtained in block 2100 from e.g. reading a value stored in a memory. The initial temperature $T_{INI}$ is also obtained in block 2100 from e.g. reading a corresponding value stored in a memory. The actual temperature $T_{ACT}$ is measured in block 2200 or received from a temperature sensor as a value $T_A$. The reference value is determined in block 2300 from the initial threshold value $I_{THINI}$, the initial temperature $T_{INI}$ and the actual temperature $T_{ACT}$, by correcting the initial threshold value $I_{THINI}$ with the temperature difference between the initial threshold value $I_{THINI}$ and the initial temperature $T_{INI}$ to obtain the reference value $I_{THR}$.

Correcting the initial threshold value $I_{THINI}$ with the temperature difference between the initial threshold value $I_{THINI}$ and the initial temperature $T_{INI}$ to obtain the reference value $I_{THR}$ may be performed by using a pre-determined relationship of threshold current level on temperature, e.g. using the measurement results discussed with reference to FIG. 3, stored in an appropriate form in the controller 300 or in an external memory accessible by the controller. The correcting may use a lookup table stored in the controller. Alternatively, correcting may e.g. use a parameterization of the dependency of the threshold current level on temperature. Such parameterization may e.g. have the form of an exponential dependency using constants $\beta$ and $\mu$ as:

$$I_{THR}(T_{ACT})=I_{THINI}(T_{INI})\times\mu\times e^{\beta\times(T_{ACT}-T_{INI})},$$

where the temperatures are shown in parenthesis behind the corresponding threshold current levels for clarlity.

Constants $\beta$ and $\mu$ may e.g. be determined from the measurement shown in FIG. 3 and stored in the controller during manufacturing of the optical disk drive and an associated calibration procedure. Constants $\beta$ and $\mu$ may alternatively have been determined batch-wise for a plurality of laser diodes for a plurality of optical disk drives and stored in the controller.

In block 3000, the actual threshold current level $I_{THACT}$ and the reference value $I_{THR}$ are compared for obtaining a comparison result $I_{COM}$. In this example, the comparison result is the relative difference between the two, i.e. $I_{COM}=(I_{THACT}-I_{THR})/I_{THR}$.

In block 4000, a laser diode quality indicator Qual is determined from the comparison result $I_{COM}$. In this example, the laser diode quality indicator is set to:
 a safe level if $I_{COM}<125\%$,
 a warning level if $125\%<I_{COM}<150\%$,
 an alarm level if $150\%<I_{COM}<200\%$, and
 an error level if $I_{COM}>200\%$.

In block 5000, a recommendation signal is determined. In this example the recommendation signal is driving an indicator device 6000 comprising a plurality of LED driving signals (not shown) arranged for driving one of a plurality of LEDs, and arranged for:
 driving a green LED if the laser diode quality indicator is at the safe level,
 driving a yellow LED if the laser diode quality indicator is at the warning level,
 driving an orange LED if the laser diode quality indicator is at the alarm level, and
 driving a red LED if the laser diode quality indicator is at the error level.

If an operator or user observes the red LED to be illuminated, he knows he has to replace the optical disk drive by another optical disk drive. If the operator observes the orange LED to be illuminated, he may continue to use the drive, but is recommended to replace it, as the drive is very likely to fail shortly. If the operator observes the yellow LED to be illuminated, he may continue to use the drive and observe the indicator device for the next few operations, to see whether the yellow LED persists to be on and/or the situation deteriorates further. If the operator observes the green LED, he may expect that the drive is functioning well.

The laser diode quality indicator Qual may also be used for e.g. determining a maximum laser power value. The maximum laser power value may e.g. be reduced when the laser diode quality indicator indicates that the laser diode quality has deteriorated and a reduced power is expected to prevent further degradation, or at least slow down further degradation.

The laser diode quality indicator Qual may also be used for e.g. determining an operating mode for the optical disk drive. The recommendation signal Recom may then be representative for the operating mode, allowing e.g. to signal to a computer program running a host computer for writing data to the optical disk that the operating mode of the drive has changed.

The operating mode may be associated with e.g. a maximum write speed for recording data on the optical disk. The maximum write speed may e.g. be reduced when the laser diode quality indicator indicates that the laser diode quality has deteriorated and a reduced write speed, associated with a reduced power, is expected to prevent further degradation, or at least slow down further degradation.

The operating mode may be associated with e.g. supporting just single-layer disks but no dual-layer disks, requiring a large power, anymore.

FIG. 7 schematically shows another embodiment of a method according to the invention, explained using the light-current relationship LI as the laser diode characteristic, the threshold current level as the parameter and the value of the threshold current level as the actual value.

In block 2001, a reference value $I_{THR}$ and a reference temperature $T_{REF}$ are obtained. The value $I_{THR}$ and a reference temperature $T_{REF}$ are obtained in block 2110 from reading values stored in a memory 2140.

In block 1001, the actual laser light output level $L_A$, the actual laser current level $I_A$, the actual temperature $T_A$, and, optionally, the laser voltage level $V_A$, are measured. The reference temperature $T_{REF}$ is received from block 2001. In this example, the actual laser light output level $L_A$ is acquired in block 1100 for a plurality of corresponding actual laser current level $I_A$ for obtaining measurement values like the ones 310-317 shown in FIG. 3. An actual uncorrected threshold current level $I_{THACTUN}$ is determined from the measurement values. The actual temperature $T_{ACT}$ is measured in block 1200 or received from a temperature sensor as a value $T_A$. The actual threshold current level $I_{THACT}$ is determined in block 2300 from actual uncorrected threshold current level $I_{THACTUN}$, the actual temperature $T_{ACT}$ and the reference temperature $T_{REF}$, by correcting the actual uncorrected threshold current level $I_{THACTUN}$ with the temperature difference between the actual temperature $T_{ACT}$ and the reference temperature $T_{REF}$ to obtain the actual threshold current level $I_{THACT}$. This embodiment differs from the embodiment described in reference with FIG. 6, in that the actually acquired values are corrected to values at the reference temperature in stead of correcting the initial values to the actual temperature. The reference temperature may have a fixed value. Correcting the actual values to values corresponding to a fixed reference temperature has the advantage that the actual corrected values can be usefully logged, e.g. for inspecting a change of the actual corrected values for a drift over time or for a sudden change with a large amount.

In block 3000, the actual threshold current level $I_{THACT}$ and the reference value $I_{THR}$ are compared for obtaining the comparison result $I_{COM}$. In this example, the comparison result is the relative difference between the two, i.e. $I_{COM} = (I_{THACT} - I_{THR})/I_{THR}$. In block 4000, the laser diode quality indicator Qual is determined from the comparison result $I_{COM}$. In block 5000, the recommendation signal is determined and provided to the indicator device 6000.

FIG. 8 schematically shows another embodiment of a method according to the invention, explained using the light-current relationship LI as the laser diode characteristic, the threshold current level as the parameter and the value of the threshold current level as the actual value.

In block 2002, the actual laser light output level $L_A$, the actual laser current level $I_A$, and, optionally, the actual temperature $T_A$ and the laser voltage level $V_A$, are measured at a first moment in time. In this example, the actual laser light output level $L_A$ is acquired in block 1220 for a plurality of corresponding actual laser current level $I_A$ for obtaining measurement values like the ones 310-317 shown in FIG. 3. An reference current level $I_{THR}$ is determined from the measurement values. The reference current level $I_{THR}$ may be further corrected to a standard temperature, e.g. as described with reference to block 1001 in FIG. 7. Block 1230 stores the reference current level $I_{THR}$ in a memory 1240, and may also store e.g. the actual temperature $T_A$, the standard temperature or other values. Block 1250 retrieves the reference current level $I_{THR}$ at a later moment in time, for providing the reference current level $I_{THR}$ to block 3000.

In block 1002, the actual laser light output level $L_A$, the actual laser current level $I_A$, and, optionally, the actual temperature $T_A$ and the laser voltage level $V_A$, are measured at a second moment in time. The second moment in time is later than the first moment in time. The second moment in time may e.g. correspond to a fixed time interval after the first moment in time, such as a one-hour time-interval. The second moment in time may e.g. correspond to a moment in time when the optical disk drive is powered on, with the first moment in time corresponding e.g. to the moment of previous powering-on on previous powering-off. In this example, the actual laser light output level $L_A$ is acquired in block 1120 for a plurality of corresponding actual laser current level $I_A$ for obtaining measurement values like the ones 310-317 shown in FIG. 3. An actual threshold current level $I_{THACT}$ is determined from the measurement values. The actual threshold current level $I_{THACT}$ may be further corrected to the standard temperature, e.g. as described with reference to block 1001 in FIG. 7.

In block 3000, the actual threshold current level $I_{THACT}$ and the reference value $I_{THR}$ are compared for obtaining the comparison result $I_{COM}$. In this example, the comparison result is the relative difference between the two, i.e. $I_{COM} = (I_{THACT} - I_{THR})/I_{THR}$. Alternatively, the comparison result may e.g. be the absolute difference between the two, i.e. $I_{COM} = (I_{THACT} - I_{THR})$. In block 4000, the laser diode quality indicator Qual is determined from the comparison result $I_{COM}$. When the relative difference is significant, the laser diode quality indicator is set to a warning level. When the relative difference is large, the diode quality indicator is set to an error level. In block 5000, the recommendation signal is determined and provided to the indicator device 6000.

Alternative embodiments of the blocks 1000, 1001, 1002, 2000, 2001, 2002 have been discussed in the summary section above and reference is made to the summary section.

E.g., the laser diode characteristic may be a light-current relationship. The parameter may be associated with at least a threshold current level associated with the light-current relationship. The parameter may be associated with at least an operating current level $I_R$, $I_W$ corresponding to a pre-determined laser diode light output level $L_R$, $L_W$. The parameter may be associated with at least an operating current level $I_R$ associated with the light-current relationship. The parameter may be associated with at least a slope value a associated with a slope of a linear segment LinSeg of the light-current relationship. The parameter may be associated with an end value $I_{END}$, $L_{END}$ of the linear segment of the light-current relationship. The parameter may be associated with at least a kink $K_K$ associated with the light-current relationship.

The laser diode characteristic may alternatively be a voltage-current relationship VI between laser diode forward voltage levels and corresponding laser diode operating current levels. The parameter may be associated with at least an operating laser diode forward voltage level $V_{OP}$ corresponding to a pre-determined laser diode operating current level $I_{OP}$. The parameter may be associated with a specific operating current level of the laser diode, e.g. the threshold current level or the read current level.

FIG. 9 shows another simplified embodiment of an optical disk drive. Reference is made to FIG. 1 for elements with the same reference numbers.

FIG. 9 shows the optical disk drive with an optical disk 1 loaded in the optical disk drive and the incident beam 11 focused by the optical arrangement 18 into a spot 21 on the optical disk.

The optical disk drive uses the sensor 200 associated with the incident beam 11 for sensing and controlling the laser output power in the incident beam, e.g. for maintaining a constant read power level, as described above.

The optical disk drive of FIG. 7 further comprises a beam splitter 16 arranged for directing a reflected beam 25 produced by the optical disk 1 upon receiving the incident beam 11, 21 to a detector 210. The detector is arranged for sensing the reflected beam 25 and for producing a sensor output signal $R_4$. The sensor output signal $R_4$ is received by a controller 310. The controller 310 is arranged to perform the same functions as the controller 300 in FIG. 1 and is thus capable of determining a laser diode quality indicator Qual. The controller 310 is further arranged to determine a data signal from the sensor output signal $R_4$, to control the focusing of the incident beam 11 on the optical disk 1, and to control a rotation of the optical disk 1 e.g. for controlling a recording speed.

Determining the laser diode quality indicator Qual may be performed while reading the optical disk, e.g. by monitoring the laser diode current associated with providing a predetermined laser diode output read power.

FIG. 10 schematically shows interacting between an optical disk drive 800 and a host controller 900 with a monitor signal 1500.

The monitor signal 1500 with a monitor signal value may be derived by the optical disk drive from the laser diode quality indicator. The monitor signal may e.g. be a signal on a control bus between drive 800 and host 900, e.g. the bus 500 indicated in FIG. 1, or a signal for accessing a register in the drive or in the host and writing the register with the monitor signal value.

The host controller 900 may obtain the monitor signal 1500 with the monitor signal value associated with a laser diode quality from the optical disk drive.

The host controller 900 may choose a reaction from comparing the monitor signal value to one or more reaction values for one or more corresponding reactions, and execute the reaction.

The reactions could e.g. include signaling to an operator whether the optical disk drive needs to be replaced, signaling to an operator whether a performance level may be at risk, adjusting an operating mode of the optical disk drive, limiting the number of supported operation modes, adjusting a recording speed of the optical disk drive and/or prohibiting further recordings with the optical disk drive.

FIG. 11 schematically shows an embodiment of a disk duplicator system 950 according to the invention.

The disk duplicator system 950 comprises a first optical disk drive 801, a second optical disk drive 802, and a monitor unit 910. The first optical disk drive 801 and the monitor unit 910 interact with a first monitor-and-control signal 1501, allowing the monitor unit 910 to retrieve e.g. information associated with the laser diode quality information, or associated with a recommendation signal as discussed above. The second optical disk drive 802 and the monitor unit 910 interact with a second monitor-and-control signal 1502. The disk duplicator system 950 may comprise more optical disk drives with corresponding monitor-and-control signals.

The disk duplicator system 950 may be arranged for copying data from a first optical disk in the first optical disk drive 801 to a second optical disk in the second optical disk drive 802 and, when present, to more optical disks in the corresponding more optical disk drives.

The monitor unit 910 monitors all monitor-and-control signals of all optical disk drives in the disk duplicator system 950. When one of the monitor-and-control signals of all optical disk drives in the disk duplicator system 950 shows an error or a warning, the monitor unit 910 may exclude the corresponding optical disk drive from the disk copy process, thus preventing to make bad or failing recordings with the drive. Alternatively, the monitor unit 910 could show a message to an operator indicating which of the optical disk drives may no longer satisfy a required performance level and signaling the operator to replace the optical disk drive by a new one.

The methods described above may be implemented in an optical disk drive, preferably in the processor 300 of the optical disk drive, or in an apparatus cooperating with an optical disk drive and communicating with the processor 300 over the interface 500.

In FIG. 12, an overview is given of a computer arrangement that can be used to carry out the methods according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. Also, the invention may be analogously applied for e.g. other optical disk drive configurations than those explicitly described in the embodiments above. Embodiments may be combined with one or more other, non-conflicting, embodiments. In the claims, any reference signs and symbols placed between parentheses shall not be construed as limiting the claim. E.g., the use of the symbol $I_{TH}$ between parenthesis behind the parameter shall not be construed as limiting the claim to the use of a threshold current level as the parameter; any other suitable parameter associated with a suitable laser diode characteristic is within the scope the invention and of the appended claims.

The invention claimed is:

1. A method for monitoring an optical disk drive performance quality comprising determining a laser diode quality indicator for a laser diode arranged in an optical disk drive for scanning an optical disk, the determining comprising:
    providing a plurality of actual laser current levels to the laser diode;
    measuring a plurality of actual laser light output levels corresponding to the actual laser current levels,
    obtaining a light-current relationship according to the respective combinations of the actual laser current levels and the actual laser light output levels;
    determining an actual threshold current level according to the light-current relationship,
    obtaining a reference value according to an initial threshold value, an initial operating temperature and an actual operating temperature,
    comparing the actual threshold current level with the reference value for obtaining a comparison result, and
    determining a laser diode quality indicator from the comparison result.

2. The method according to claim 1, wherein the laser diode quality indicator comprises a precursor signal indicative of an expected future defective state of the laser diode.

3. The method according to claim 1, wherein the laser diode quality indicator comprises an error signal indicative of an actual defective state of the laser diode.

4. The method according to claim 1, wherein
    comparing the actual threshold current level with the reference value for obtaining the comparison result comprises determining the comparison result from a difference between the actual threshold current level with the reference value, and wherein
    determining the laser diode quality indicator from the comparison result comprises:
        setting the laser diode quality indicator to a first quality level when the difference between the actual threshold current level with the reference value exceeds a first threshold, and
        setting the laser diode quality indicator to a second quality level when the difference between the actual threshold current level with the reference value exceeds a second threshold, the second threshold being larger than the first threshold.

5. The method according to claim 1, wherein obtaining the reference value comprises:
    obtaining the initial threshold value associated with the initial operating temperature,
    measuring the actual operating temperature, and
    determining the reference value from at least the initial threshold value, the initial operating temperature and the actual operating temperature.

6. The method according to claim 1, wherein determining an actual threshold current level comprises:
    acquiring an actual uncorrected threshold current level associated with the actual operating temperature,
    obtaining a reference temperature, and
    determining the actual threshold current level from at least the actual uncorrected threshold current level, the actual operating temperature and the reference temperature.

7. The method according to claim 1, wherein the light-current relationship is between laser diode light output levels and corresponding laser diode operating current levels.

8. The method according to claim 1, wherein measuring a plurality of the actual laser light output levels is performed without focusing on an optical disk with the optical disk drive.

9. The method according to claim 1, further comprising: determining a recommendation signal from the laser diode quality indicator.

10. The method according to claim 9, further comprising: providing the recommendation signal to an indicator device, the indicator device being able to indicate to an operator whether the optical disk drive needs to be replaced.

11. The method according to claim 1, further comprising: determining a maximum laser power value from the laser diode quality indicator.

12. The method according to claim 11, further comprising: determining an operating mode for the optical disk drive from at least one of the maximum laser power value and the laser diode quality indicator.

13. The method according to claim 11, further comprising: determining a maximum recording speed from at least one of the maximum laser power value and the laser diode quality indicator.

14. The method according to claim 1, further comprising: determining an operating mode from a set of operating modes for the optical disk drive from at least the laser diode quality indicator.

15. The method according to claim 1, further comprising: selecting the operating mode determined from the set of operating modes and operating the optical disk drive with the selected operating mode.

* * * * *